(12) United States Patent
Roderick

(10) Patent No.: US 7,712,019 B1
(45) Date of Patent: *May 4, 2010

(54) METHOD, APPARATUS AND SYSTEM FOR IMPROVED CONTENT MANAGEMENT AND DELIVERY

(75) Inventor: Stephen C. Roderick, Corvallis, OR (US)

(73) Assignee: GoHome Networks, Inc., Corvallis, OR (US)

( * ) Notice: Subject to any disclaimer, the term of this patent is extended or adjusted under 35 U.S.C. 154(b) by 1307 days.

This patent is subject to a terminal disclaimer.

(21) Appl. No.: 09/664,578

(22) Filed: Sep. 18, 2000

(51) Int. Cl.
G06F 17/00 (2006.01)
G06Q 30/00 (2006.01)

(52) U.S. Cl. .................. 715/205; 715/208; 715/255; 705/10; 705/14.16; 705/14.42

(58) Field of Classification Search ...... 715/501.1–513, 715/400, 28, 205–208, 234, 255, 273, 271, 715/256, 249; 707/104.1; 705/28, 400, 1, 705/14, 10, 14.4, 14.41, 14.42, 14.16; 709/223, 709/219; 345/744
See application file for complete search history.

(56) References Cited

U.S. PATENT DOCUMENTS

| | | | |
|---|---|---|---|
| 5,043,891 A | 8/1991 | Goldstein et al. | |
| 5,179,652 A | 1/1993 | Rozmanith et al. | |
| 5,227,874 A * | 7/1993 | Von Kohorn | 705/10 |
| 5,235,680 A | 8/1993 | Bijnagte | |
| 5,325,297 A | 6/1994 | Bird et al. | |
| 5,835,236 A | 11/1998 | Barbari | |
| 5,864,871 A | 1/1999 | Kitain et al. | |
| 5,890,172 A * | 3/1999 | Borman et al. | 715/501.1 |
| 5,894,554 A | 4/1999 | Lowery et al. | |
| 5,897,622 A | 4/1999 | Blinn et al. | |
| 5,923,252 A | 7/1999 | Sizer et al. | |
| 5,937,418 A | 8/1999 | Ferris et al. | |
| 5,944,780 A | 8/1999 | Chase et al. | |
| 5,956,716 A | 9/1999 | Kenner et al. | |
| 5,974,396 A | 10/1999 | Anderson et al. | |
| 5,974,418 A | 10/1999 | Blinn et al. | |
| 5,974,572 A | 10/1999 | Weinberg et al. | |

(Continued)

FOREIGN PATENT DOCUMENTS

WO    WO 97 01137 A    1/1997

(Continued)

OTHER PUBLICATIONS

"John L. Scott, Real Estate," http://www.johnlscott.com/, Printed Mar. 22, 1999, 1 page.

(Continued)

*Primary Examiner*—Adam L Basehoar
(74) *Attorney, Agent, or Firm*—Schwabe Williamson & Wyatt

(57) ABSTRACT

An apparatus comprising a storage medium and a communicatively coupled processor are presented. The storage medium has stored therein a plurality of executable instructions which, when executed, implement an information server which, upon receiving a request including a resource identifier for an information page that may or may not exist, constructs and issues commands to retrieve the requested information and dynamically generates instructions to create the requested information page for provision to a requesting client if the information page does not exist.

21 Claims, 8 Drawing Sheets

U.S. PATENT DOCUMENTS

| | | | | |
|---|---|---|---|---|
| 5,978,773 | A * | 11/1999 | Hudetz et al. | 705/23 |
| 5,983,227 | A | 11/1999 | Nazem et al. | |
| 6,029,141 | A * | 2/2000 | Bezos et al. | 705/27 |
| 6,049,835 | A * | 4/2000 | Gagnon | 709/245 |
| 6,061,057 | A * | 5/2000 | Knowlton et al. | 345/744 |
| 6,061,719 | A * | 5/2000 | Bendinelli et al. | 709/218 |
| 6,064,979 | A | 5/2000 | Perkowski | |
| 6,085,242 | A * | 7/2000 | Chandra | 709/223 |
| 6,122,648 | A * | 9/2000 | Roderick | 715/513 |
| 6,247,047 | B1 * | 6/2001 | Wolff | 709/219 |
| 6,253,208 | B1 * | 6/2001 | Wittgreffe et al. | 707/104.1 |
| 6,263,322 | B1 * | 7/2001 | Kirkevold et al. | 705/400 |
| 6,324,522 | B2 * | 11/2001 | Peterson et al. | 705/28 |
| 6,334,111 | B1 * | 12/2001 | Carrott | 705/14 |
| 6,401,075 | B1 * | 6/2002 | Mason et al. | 705/14 |
| 6,466,970 | B1 * | 10/2002 | Lee et al. | 709/217 |
| 6,502,076 | B1 * | 12/2002 | Smith | 705/14 |
| 7,421,723 | B2 * | 9/2008 | Harkness et al. | 725/14 |
| 2001/0007991 | A1 * | 7/2001 | Tobin | 709/203 |
| 2002/0046118 | A1 * | 4/2002 | Minte | 705/14 |
| 2002/0072968 | A1 * | 6/2002 | Gorelick et al. | 705/14 |
| 2002/0082919 | A1 * | 6/2002 | Landau et al. | 705/14 |
| 2004/0117259 | A1 * | 6/2004 | Morrisroe et al. | 705/14 |
| 2007/0192180 | A1 * | 8/2007 | Lange | 705/14 |

FOREIGN PATENT DOCUMENTS

| | | | |
|---|---|---|---|
| WO | WO 98 03923 A | 1/1998 | |

OTHER PUBLICATIONS

"John L. Scott, Real Estate," http://www.johnlscott.com/HomeSearch.htm, Printed Mar. 22, 1999, 1 page.

"John L. Scott Properties for Sale in Oregon," http://www.johnlscott.com/scripts/regionswithinstate.asp?codestate=or, Printed Mar. 22, 1999, 1 page.

"John L. Scott Properties for Sale in Multnomah County Oregon," http://www.johnlscott.com/scripts/citieswithinregion.asp?Idregion=45&IDPropertyType=1, Printed Mar. 22, 1999, 1 page.

"John L. Scott, Listing," http://www.johnlscott.com/scripts/ListingResult.asp?IDPropertyType=1&IDListing=o86676, Printed Mar. 22, 1999, 1 page.

"John L. Scott, Listing," http://www.johnlscott.com/scripts/Listing...1t.asp?IDPropertyType=1&IDListing=o101249, Printed Mar. 22, 1999, 1 page.

"Web-design—Real estate and small business enterprises Letchford Design," http://www.letchforddesign.com, 2000, 8 pages.

"barnesandnoble.com—The World's Largest Bookseller Online," http://www.barnesandnoble.com, Printed Mar. 24, 1999, 2 pages.

"barnesandnoble.com Bill Gates Sweepstakes," http://www.barnesandnoble.com/promo/gates/indes.asp?userid_2UAVN78SNW&PCOUNT=0, Printed Mar. 24, 1999, 1 page.

"barnesandnoble.com—Book Search," http://shop.barnesandnoble.com/booksearch...serid=2UAVN78SNW&pcount=0 &isbn=0446525685, Printed Mar. 24, 1999, 1 page.

"The Equity Group, Inc. Realtors—Home Search," http://www.equitygroup.com/101249, Printed Mar. 22, 1999, 1 page.

"Long & Foster Real Estate: Homes for Sale . . . Pennsylvania, West Virginia and Delaware," http://www.longandfoster.com/, Printed Mar. 22, 1999, 1 page.

"Long & Foster," http://www.longandfoster.com/long/maps/homesign.,ap?160,161, Printed Mar. 22, 1999, 1 page.

"Long & Foster—Searching for Homes for Sale," http://www.longandfoster.com/search/long/...gory=Standard&VAR_Open=No &VAR_Featured=No, Printed Mar. 22, 1999, 1 page.

"Long & Foster—Searching for Homes in Baltimore Area (MD)," http://www.longandfoster.com/search/long/...tandard &VAR_Open=False&VAR_Featured=False, Printed Mar. 22, 1999, 1 page.

"Long & Foster—Homes For Sale—Search Results," http://www.longandfoster.com/search/long/...tured=False &VAR_PropertyCategory=Standard, Printed Mar. 22, 1999 2 pages.

Long & Foster—House For Sale: Jim Linthicum 1-800-801-3080, http://www.longandfoster.com/search/long/...tured=False &VAR_PropertyCategory=Standard, Printed Mar. 22, 1999, 1 page.

"Weichert Realtors," http://www.weichert.com/, Printed Mar. 22, 1999, 2 pages.

"Weichert Realtors," http://www.weichert.com/property/, Printed Mar. 22, 1999, 1 page.

"Weichert Realtors," http://www.weichert.com/templates/maps/statemap2.map?216,221, Printed Mar. 22, 1999, 1 page.

"Weichert Realtors," http://www.weichert.com/search/templates/...ty/city?CEQ_State=MD&CEQ_County=BALTIMORE, Printed Mar. 22, 1999, 1 page.

"Weichert Realtors," http://www.weichert.com/search/templates/property/proplist, Printed Mar. 22, 1999, 2 pages.

"Weichert Realtors," http://www.weichert.com/search/templates/...perty?CEQ_TransactionNumber=MRISBC2658361, Printed Mar. 22, 1999, 1 page.

"Owners.com: Owners.com Home," http://owners.com/, Printed Mar. 22, 1999, 1 page.

"Owners.com: Search for a Home," http://owners.com/Search/BeginSearch.asp?State=&ListingID=Listing+ID&x=8&y=8, Printed Mar. 22, 1999, 1 page.

"Owners.com: Search for a Home," http://owners.com/Search/SearchCriter...p?State=CA&=%3E%3E+Next+%3E%3E &ListingID=, Printed Mar. 22, 1999, 1 page.

"Owners.com: Search Results," http://owners.com/Search/ShowResultLi...ty=&County=&MetroArea=803 &=+Begin+Search+, Printed Mar. 22, 1999, 2 pages.

"Owners.com: Listing Information," http://www.owners.com/Search/ShowListing...et&MinPrice=&MaxPrice=&Sorder=1 &fp+Cnm+, Printed Mar. 22, 1999, 1 page.

"Owners.com: Listing Information," http://www.owners.com/Search/ShowListing...55FSState=&ListingID=MBQ1519ID&x=13 &y=12, Printed Mar. 22, 1999, 1 page.

"For Sale by Owner Connection—Real Estate," http://www.fsboconnection.com/, Printed Mar. 22, 1999, 1 page.

"Connecticut homes for sale by owner," http://www.fsboconnection.com/ct.html, Printed Mar. 22, 1999, 1 page.

"Connecticut homes for sale by owner," http://www.fsboconnection.com/cwct.html, Printed Mar. 22, 1999, 5 pages.

"CT Homes For Sale By Owner," http://www.fsboconnection.com/120112.html, Printed Mar. 22, 1999, 1 page.

"Welcome to CyberHomes," http://cyberhomes.com/, Printed Mar. 22, 1999, 1 page.

"Welcome to CyberHomes Michigan Real Estate," http://cyberhomes.com/cyberhomes/template...cfm?state_name=michigan&brand=cyberhomes, Printed Mar. 22, 1999, 1 page.

"Cyberhomes of Det—Selected Features," http://www.cyberhomes.com/cyberhomes/template...me=michigan&mls_name=det &brand=cyberhomes, Printed Mar. 23, 1999, 1 page.

"Cyberhomes of Det—Selected Features," http://www.cyberhomes.com/cyberhomes/template...cfm?mls_name=det &brand=cyberhomes&radius=, Printed Mar. 23, 1999, 1 page.

"Cyberhomes of Det Real Estate," http://www.cyberhomes.com/cyberhomes/template...in=&parking_param=&aread_city= &id=00912738, Printed Mar. 23, 1999, 1 page.

"Realtor.Com: Your Next Home Is Here," http://www.realtor.com/, Printed Mar. 22, 1999, 1 page.

"Realtor.Com: Find a Home—Start Your Search," http://www.realtor.com/FindHome/USMapHome.asp, Printed Mar. 22, 1999, 2 pages.

"Realtor.Com: Find a Home in Oregon," http://www.realtor.com/oregon/nbselor.asp, Printed Mar. 22, 1999, 2 pages.

"Realtor.Com: Find a Home in Portland, Oregon," http://www.realtor.com/portland/nbregion1.asp, Printed Mar. 22, 1999, 2 pages.

"Realtor.Com: Find a Home in Portland, Search Criteria," http://www.realtor.com/portland/selectnb...1=Portland&comm=97230+-+Portland&x=67&y=6, Printed Mar. 22, 1999, 2 pages.

"Realtor.Com: Home Search Results," http://www.realtor.com/FindHome/HomeListi...e=250000&mnbed=3&mnbath=2&mnsqft=0&pgsz=3, Printed Mar. 22, 1999, 1 page.

"Realtor.Com: Home Listing (MLS Portland, ID#102026)," http://www.realtor.com/FindHome/HomeListi...nbath=2& mnsqft=0&pgsz=3&lid=102026&snum=4, Printed Mar. 22, 1999, 1 page.

"Realtor.Com: Home Listing (MLS Portland, ID#102026)," http://www.realtor.com/FindHome/HomeListi...tland&mlsttl=Portland&lid=102026&x=66&y=9, Printed Mar. 22, 1999 1 page.

"Welcome to Windermere Real Estate," http://www.windermere.com, Printed Mar. 22, 1999, 1 page.

"Windermere Real Estate," http://www.windermere.com/index2.cfm, Printed Mar. 22, 1999, 1 page.

"Windermere—Property Detail," http://home.windermere.com/properties/personalized/propertydetail2.cfm, Printed Mar. 22, 1999, 2 pages.

"Open Homes for Sale—San Francisco Area—East Bay," http://www.homefinder.com Printed Mar. 22, 1999, 1 page.

"Open Homes for sale San Francisco Bay Are...ay Real Estate—Internet Homefinder (tm)," http://www.homefinder.com/find, Printed Mar. 22, 1999, 1 page.

"Open Homes for sale San Francisco Bay Are...ay Real Estate—Internet Homefinder (tm)," http://www.homefinder.com/find/EBRD_search.cfm, Printed Mar. 22, 1999, 1 page.

"Internet Homefinder (tm) Results," http://www.homefinder.com/find/EBRD_search.cfm, Printed Mar. 22, 1999, 1 page.

"Internet Homefinder: Found," http://www.homefinder.com/find/EBRD_detail.cfm?LIST_NUMB=99001361, Printed Mar. 22, 1999, 1 page.

"Akron Beacon Journal HomeHunter," http://www.homehunter.com/ohio/scripts/st...userw=xtvOJ_txAwt8tE_FD0C&ck=0&ver=2.61f, Printed Mar. 22, 1999, 1 page.

"Akron Beacon Journal HomeHunter Search Page," http://www.homehunter.com/ohio/scripts/st...userw=xtvOJ_txAwt8tE_FD0C&ck=0&ver=2.61f, Printed Mar. 22, 1999, 1 page.

"Akron Beacon Journal HomeHunter Search by MLS with Photos," http://www.homehunter.com/ohio/scripts/st...userw=xtvOJ_txAwt8tE_FD0C&ck=0&ver=2.61f&x=13&y=16, Printed Mar. 22, 1999, 1 page.

"Akron Beacon Journal HomeHunter—Home Details," http://www.homehunter.com/ohio/scripts/st...userw=xtvOJ_txAwt8tE_FD0C&ck=0&ver=2.61f, Printed Mar. 22, 1999, 1 page.

"The California Living Network," http://ca.Living.net/, Printed Mar. 22, 1999, 1 page.

"results," http://38.246.127.10/scripts/ll.dll/Link...Any&bathrooms=Any&minprice=0&maxprice=500, Printed Mar. 22, 1999, 1 page.

"Property Detail," http://38.246.127.10/scripts/morephotos.dll/detail?listid=2642669, Printed Mar. 22, 1999, 1 page.

"Real Estate Property & Home Related Resource—Homes & Land," http://www.homes.com/index.html, Printed Mar. 22, 1999, 1 page.

"United States Map," http://www.homes.com/realestate/usmap.html, Printed Mar. 22, 1999, 1 page.

"Oregon State Map," http://www.homes.com/cgi-bin/statemake/OR/Oregon, Printed Mar. 22, 1999, 1 page.

"Cities within 25 miles," http://www.homes.com/cgi-bin/statemap/oregon/0?108,109, Printed Mar. 22, 1999, 1 page.

"Select Listing to View," http://www.homes.com/cgi-bin/pricenums/OR/Salem?fr_id=0, Printed Mar. 22, 1999, 1 page.

"Residential Properties," http://www.homes.com/cgi-bin/props/+/OR/SALEM, Printed Mar. 22, 1999, 3 pages.

"Property #2222474, 5 Beds, 2 Baths, 1 Half-bath," http://www.homes.com/cgi-bin/propspec/2222474, Printed Mar. 22, 1999, 1 page.

"Homeseekers—Homes for Sale," http://www.homeseekers.com/main.htm Printed Mar. 22, 1999, 1 page.

"Welcome to Bay Area, No. California Real Estate, total MLS participation!," wysiwyg://body.981/http://www.homeseekers.com/main_mris.htm Printed Mar. 22, 1999, 1 page.

"Metropolitan Regional Information System, Maryland Area," http://www.homeseekers.com/mris/md/index.htm Printed Mar. 22, 1999, 1 page.

"Homeseekers Search," http://www.homeseekers.com/scripts/search.asp?_org_id=mris&st=md, Printed Mar. 22, 1999, 1 page.

"Homeseekers Property Listings," http://www.homeseekers.com/bin/list.dll, Printed Mar. 22, 1999, 1 page.

"Homeseekers Property Detail," http://www.homeseekers.com/bin/detail.dll... 6750&_current=3&mls_property-id=BC2690329, Printed Mar. 22, 1999, 1 page.

"Listinglink—United State Real Estate Listings," wysiwyg://1017/http://listingmark.com/ustates/, Printed Mar. 22, 1999, 1page.

"Welcome to Listing Link—Real Estate on the Internet," http://listinglink.com/, Printed Mar. 22, 1999 1 page.

"ListingLink—State Page, CA Southern" wysiwyg://1021/http://listingmark.com/ustates/ca/ca_south/, Printed Mar. 22, 1999, 1 page.

"ListingLink—City Selection," wysiwyg://1023/http://listinglink.com/DBCounty/3310.html, Printed Mar. 22, 1999, 1 page.

"results," http://listinglink.com/scripts/ll.dll/Lin...=100K&maxprice=500K&city=4&city-1&format=, Printed Mar. 22, 1999, 1 page.

"Property Detail," http://listinglink.com/scripts/morephotos.dll/detail?listid=3552156, Printed Mar. 22, 1999, 1 page.

"The NEWMLS—Real Estate Agent Web Site H . . . Listing Search Engine by Property America," http://newmls.com/, Printed Mar. 22, 1999, 1 page.

"Property America—Real Estate Search," http://newmls.com/propam/base/stateselect.cgi, Printed Mar. 22, 1999, 1 page.

"NewMls—County Search," http://newmls.com/propam/base/data/st9base/search2.cgi, Printed Mar. 22, 1999, 1 page.

"NewMls—County Search," http://newmls.com/propam/base/data/st9/base/search3.cgi, Printed Mar. 22, 1999, 5 pages.

"NewMls—County Search," http://newmls.com/propam/base/data/st9/base/search4.cgi, Printed Mar. 22, 1999, 2 pages.

"real estate Georgia Real Estate Atlanta homes RE/MAX of Atlanta real estate," http://remax-atlanta-ga.com/home.pm, Printed Mar. 22, 1999, 1 page.

"real estate Atlanta Georgia homes realtor RE/MAX of Atlanta," http://remax-atlanta-ga.com/search.pm?tk+206.163.140.100&absmax, Printed Mar. 22, 1999, 1 page.

"real estate Atlanta Georgia homes realtor RE/MAX of Atlanta," http://remax-atlanta-ga.com/search.pm?tk=...group=5&HaveNum=&search.x-100&search.y=10, Printed Mar. 22, 1999, 1 page.

"RE/MAX of Atlanta," http://remax-atlanta-ga.com/preview.pm?tk...986947&city=ALL&nn=0&cnt=0&group=5&Table=, Printed Mar. 22, 1999, 1 page.

"real estate Atlanta Georgia homes realtor RE/MAX of Atlanta," http://remax-atlanta-ga.com/search.pm?tk=...group=5&HaveNum=&search.x-100&search.y=13, Printed Mar. 22, 1999, 1 page.

"Charleston, South Carolina Real Estate—Prudential Carolinas Realty," http://www.prucharleston.com/, Printed Mar. 22, 1999 1 page.

"Charleston, South Carolina Real Estate—Prudential Carolinas Realty," http://www.prucharleston.com/, Printed Mar. 22, 1999, 1 page.

"Charleston, South Carolina Real Estate—Prudential Carolinas Realty," http://www.prucharleston.com/html3_listings.html, Printed Mar. 22, 1999, 1 page.

"Search," http://webserver.verian.com/realty/euser/usersearch.cfm?User=40&Group=39&Area=570, Printed Mar. 22, 1999, 1 page.

"Listings Index," http://webserver.verian.com/realty/euser/listindex.cfm, Printed Mar. 22, 1999.

"Listing Detail View," http://webserver.verian.com/realty/euser/listingview.cfm, Printed Mar. 22, 1999.

"The Real Estate Book Online; Real Estate, . . . s and Properties Throughout North America," http://www.treb.com/, Printed Mar. 22, 1999, 1 page.

"The Real Estate Book—Home Directory—Choose Area Page," http://www.treb.com/treb/apps/ForSale/statepage.cfm, Printed Mar. 22, 19999, 1 page.

"Oregon," http://www.treb.com/treb/apps/ForSale/metromain.cfm?state_id=38, Printed Mar. 22, 1999, 1 page.

"Salem/Willamette Valley," http://www.treb.com/treb/apps/ForSale/Cit...961&beds=1&minprice=70000&maxprice_150000, Printed Mar. 22, 1999, 1 page.

"The Real Estate Book Online Search Results," http:///www.treb.com/treb/apps/ForSale/Lis...rice=70000&maxprice=150000&beds=1baths=0, Printed Mar. 22, 1999, 1 page.

"The Real Estate Book Online Search Results," http:///www.treb.com/treb/apps/ForSale/hou...rice=70000&maxprice=150000&beds=1baths=0, Printed Mar. 22, 1999, 1 page.

"Welcome to Harmon Homes Online!," http://www.harmonhomes.com/, Printed Mar. 22, 1999, 1 page.

"Harmon Homes—Select State To Search," http://www.harmonhomes.com/html/search.shtml, Printed Mar. 22, 1999, 1 page.

"Harmon Homes—Search California (South)," http://www.harmonhomes.com/areas/xSouthCA.shtml, Printed Mar. 22, 1999, 1 page.

"Harmon Homes—Search Results," http://www.harmonhomes.com/cgi-bin/hpc/statesearch.cgi, Printed Mar. 22, 1999 5 pages.

"Cdnow: Your Music. Your Store.," http://www.cdnow.com/cgi-bin/mserver/redirect/leaf=, Printed Mar. 24, 1999, 2 pages.

"Cdnow: Search Results," http://www.cdnow.com/cgi-bin/mserver/SID=...6921/pagename-/RP/CDN/FIND/popsearch.html, Printed Mar. 24, 1999, 2 pages.

"Cdnow: Discography," http://www.cdnow.com/cgi-bin/mserver/SID=...cography.html/ArtistID=FRN-COLTRANE*JOHN/, Printed Mar. 24, 1999, 1 page.

"Cdnow: Items," http://www.cdnow.com/cgi-bin/mserver/SID=...istID=FRN-COLTRANE*JOHN/dden+SD-2531+20+1, Printed Mar. 24, 1999, 2 pages.

"Amazon.com—Books, Music, & More," http://www.amazon.com/exec/obidos/subst/home/home.html/002-7625891-9375239, Printed Mar. 24, 1999, 1 page.

"Amazon.com: A Glance: Business@the Spee . . . Thought: Using A Digital Nervous Syst," http://www.amazon.com/exec/obidos/ASIN/0446525685/002-7625891-9375239, Printed Mar. 24, 1999, 1 page.

"Borders.com—Home," http://www.borders.com/ Printed Mar. 24, 1999, 3 pages.

"Borders.com—Books," http://www.borders.com/sections/section_10000.html, Printed Mar. 24, 1999, 2 pages.

"Borders.com—Don't Count the Candles, Just Keep the Fires Lit," http://www.borders.com/fcgi-bin/db2www...2w/Details?mediaType=Book&prodID=51217803, Printed Mar. 24, 1999, 1 page.

"The Smith McLellan Group—Kelowna Real Estate/Kelowna, B.C. Canada," http://okanaganbc.com/, Printed Mar. 22, 1999, 3 pages.

"Kelowna Real Estate—The Smith-McLellan Group BC, Canada," http://okanaganbc.com/listings/listindex.htm, Printed Mar. 22, 1999, 5 pages.

"The Smith-McLellan Group—Real Estate Kelowna, B.C. Canada," http://okanaganbc.com/listings/1272ethal/lilsting.htm, Printed Mar. 22, 1999, 1 page.

"Internet Search Technique Using Universal Product Codes," IBM Technical Disclosure Bulletin, US, IBM Corp. New York, vol. 41, No. 1, 1998, XP000772107, ISSN: 0018-8689, p. 279.

Jean-Claude Mamou, "ODBC and Mosaic," 'Online!, 02 Technology, Versailles, France XP002153601, http://www.w3.org/Hisotry/1995/WWW/Gateways/OQL.html, retrieved Nov. 22, 2000.

Dan Johnson, "Converting PC GUIs for NonPC Devices," Circuit Cellar Ink, US, CT, vol. 91, Feb. 1998, XP000852859, ISSN: 0896-8985, pp. 40-45.

* cited by examiner

| 602 | 604 | 606 | 608 | 610 | 612 | 614 | 616 | 618 |
|---|---|---|---|---|---|---|---|---|
| MLS ID | LISTING AGENT | STYLE | PRICE | BEDS | BATHS | AIR | GARAGE | TAXES |
| BC 35740 | 35 | BUNGALOW | $227,000 | 4 | 2 | Y | Y | $2,100 |
| BC 37540 | 27 | RANCH | $185,900 | 2 | 1 | Y | N | $1,100 |

MARKETING EVALUATION REPORT: 700

PERIOD ENDING: DECEMBER 31, 1998 — 701

702 {
  AGENT 0: 1,800 HITS
    450 REQUESTS FOR INFORMATION
    25 REQUESTS FOR TELEPHONE CALL FOLLOW UP
    $125,000 - $175,000 PRODUCT PRICE RANGE
  } 710

⋮

AGENT 112: 350 HITS
    250 REQUESTS FOR INFORMATION
    50 REQUESTS FOR TELEPHONE CALL FOLLOW UP
    $1,500,000 - $2,250,000 PRODUCT PRICE RANGE

704 — TELEVISION ADVERTISING
    23,000 HITS
    230 REQUESTS FOR INFORMATION
    0 REQUESTS FOR TELEPHONE CALL FOLLOW UP
    $14,000 - $2,250,000 PRODUCT PRICE RANGE

706 — RADIO ADVERTISING
    2300 HITS
    23 REQUESTS FOR INFORMATION
    0 REQUESTS FOR TELEPHONE CALL FOLLOW UP
    $14,000 - $150,000 PRODUCT PRICE RANGE

708 — INTERNET ADVERTISING
    2450 HITS
    1400 REQUESTS FOR INFORMATION
    140 REQUESTS FOR TELEPHONE CALL FOLLOW UP
    $175,000 - $450,000 PRODUCT PRICE RANGE

709 — PRINT ADVERTISING
    1750 HITS
    17 REQUESTS FOR INFORMATION
    4 REQUESTS FOR TELEPHONE CALL FOLLOW UP
    $275,000 - $450,000 PRODUCT PRICE RANGE

FIG. 7

METHOD, APPARATUS AND SYSTEM FOR IMPROVED CONTENT MANAGEMENT AND DELIVERY

RELATED APPLICATION

The present application is a continuation of U.S. Nonprovisional Application No. 09/228,259 which was filed on Jan. 11, 1999, titled "METHOD, APPARATUS AND SYSTEM FOR IMPROVED CONTENT MANAGEMENT AND DELIVERY" and issued as U.S. Pat. No. 6,122,648 on Sep. 19, 2000.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise expressly reserves all rights whatsoever in said copyright works.

BACKGROUND OF THE INVENTION

1. Field of the Invention

The present invention relates to the field of data processing over data networks and, in particular, to a method, apparatus and system for improved content management and delivery.

2. Background Information

As computer technology has evolved, so too has the use of data networks to communicatively couple computer systems together enabling them to communicate with one another. Those skilled in the art will appreciate that data networks may be configured in a number of alternative network topologies, employing any number of alternative communication protocols. From small peer-to-peer networks, to local area networks (LAN), wide area networks (WAN) and enterprise networks (sometimes referred to as an intranet), to global data networks. One of the more popular of such global data networks is colloquially referred to as the Internet, an Internetworking of governmental, educational and commercial networks and servers throughout the world.

Once the domain of scholars and computer researchers, the introduction and acceptance of the HyperText Markup Language (HTML) and the HyperText Transfer Protocol (HTTP) associated with the World Wide Web (WWW) initiative effectively opened the Internet to anyone with an appropriately configured computer system. With the increased accessibility brought about with the WWW, data networks such as the Internet have evolved into a limitless collection of information for those with the computer savvy to access them.

One of the criticisms of the Internet, in particular, is that the wealth of information that is theoretically available on the Internet is not easily identified and retrieved by a typical user. Until recently, this difficulty in accessing the eclectic collection of information available on the Internet has not really been a problem, as many netizens[1] rely on search engines and the like to locate information of interest. Simplistically speaking, search engines search the meta-tags and text of a number of web pages in an effort to identify the information of interest. Until recently, the use of such search engines has proven acceptable as a means of identifying information on the web.

[1]Those skilled in the art will appreciate that a new vocabulary has evolved to describe the evolving sociology of the Internet, wherein a netizen is a citizen on the Internet, i.e., an Internet user.

Recently, however, the Internet has evolved to support electronic commerce, sometimes referred to as e-commerce. Electronic commerce sites on, for example, the Internet are presented in the form of publicly accessible web pages which place the stock, availability and pricing information of their products online. A typical e-commerce site may be thought of as being comprised of at least two parts, a first part which is comprised of the HTML document to create the graphical user interface (GUI) on the Internet, and a second part comprised of a database housing the product information, i.e., stock/availability, and pricing information. The GUI front end provides the user with a means of searching for product information, stock or availability, and pricing by entering search terms or a query list, which is then used to access and retrieve the appropriate information from the database for display to the user. Accordingly, it typically requires at least two searches, often more, to identify the particular information of interest on the Internet. This makes it difficult, at best, for many netizens to find product information as it is often buried in databases hidden from search engines. One solution to make product information more readily accessible is to forego the product databases and have programmers generate HTML code for dedicated web pages for each product. One drawback of such a solution, however, is that substantial investments have been made to put together the current product databases. To simply forego using current product databases would be a costly solution, not to mention the substantial cost of generating dedicated web pages for each product. However, companies staking their commercial success on the e-commerce business paradigm will attest that the current difficulty conducting e-commerce is resulting in lost opportunity and unrealized profit for many e-commerce sites.

Thus, an improved method, apparatus and system for identifying, managing and delivering information content, e.g., product information, is required, unencumbered by the deficiencies and inherent limitations commonly associated with data networks and the network devices of the prior art. It will be apparent to those skilled in the art, from the description to follow, that the present invention achieves these and other desired results.

SUMMARY OF THE INVENTION

In accordance with the teachings of the present invention, a method, apparatus and system for managing and delivering informational content over a data network is presented. In particular, in accordance with one embodiment of the present invention, an apparatus comprising a storage medium and a communicatively coupled processor are presented. The storage medium has stored therein a plurality of executable instructions which, when executed, implement an information server which, upon receiving a request including a resource identifier for an information page/directory that may or may not exist, constructs and issues queries to retrieve the requested information and dynamically generates instructions to create the requested information page for provision to a requesting client if the information page does not exist.

BRIEF DESCRIPTION OF DRAWINGS

The present invention will be described by way of exemplary embodiments, but not limitations, illustrated in the accompanying drawings in which like references denote similar elements, and in which:

FIG. 6 graphically illustrates an example product database suitable for use in accordance with the teachings of the present invention;

FIG. 7 graphically illustrates an example marketing report generated in accordance with one aspect of the present invention.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers and configurations are set forth in order to provide a thorough understanding of the present invention. However, it will also be apparent to those skilled in the art that the present invention may be practiced without these specific details. In other instances, well known features are omitted or simplified for clarity.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
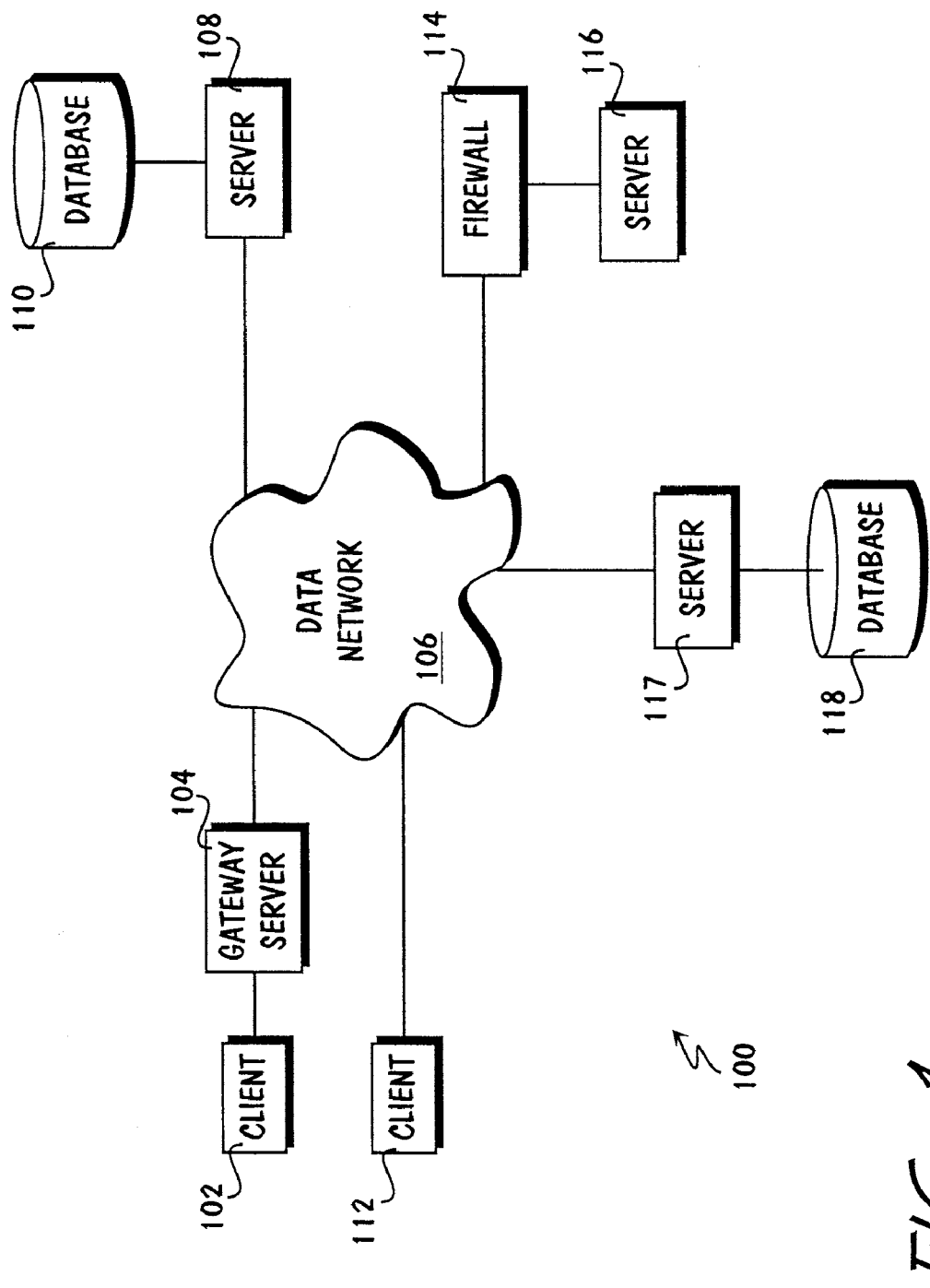
FIG. 1 illustrates a block diagram of an example data network incorporating the teachings of the present invention.

With reference to FIG. 1, an operating environment within which the teachings of the present invention may be practiced will be developed more fully in accordance with the block diagram of example data network 100. As provided in FIG. 1, data network 100 is comprised of a plurality of clients, e.g., 102 and 112 that are communicatively coupled to a plurality of information sources, e.g., servers 108, 116 and 117, and databases 110 and 118, via one or more data networks, e.g., data network 106, as shown. In one embodiment, data network 106 represents a global data network such as the Internet, while in alternate embodiments, data network 106 represents an enterprise network or an Intranet. In accordance with the teachings of the present invention to be described more fully below, an information server enabled with the teachings of the present invention, e.g., server 108, invokes an instance of an information server which, upon receiving a request including a resource identifier for an information page/directory that does not exist, constructs and issues one or more queries to accessible information resources to retrieve the requested information and dynamically generates instructions to create the requested information page for provision to the requesting client. In accordance with the teachings of the present invention, if the information page/directory identifier by the received request does exist, the requested information page is provisioned to the requesting client.

In one exemplary embodiment, to be developed more fully below, the resource identifier is comprised of an industry standard product identifier (ISPID), wherein the information server dynamically generates the instructions to create the requested information page to provision to the requesting client, in response to receiving a request from the client comprising the ISPID as the resource identifier for an information page that does not exist. Thus, those skilled in the art will appreciate that a server incorporating the teachings of the present invention for dynamically generating instructions to create an information page in response to receiving a request comprised of an industry standard product identifier, effectively place their entire inventory of products on the data network at uniquely addressable locations (e.g., web sites, web pages, etc.), without having to resort to multiple intermediate information pages generating common gateway interface (CGI) scripts, or the un-memorable, lengthy URLs commonly associated with the prior art. Accordingly, the present invention enables a vendor to utilize the information contained in their current product databases, protecting the substantial investment made to generate such databases, while offering improved visibility of their product line to their current or potential customer base.

As shown in FIG. 1, clients 102 and 112 can be any of a wide range of computing devices known in the art which enable a user to access information using a messaging protocol via data network 106. In one embodiment, for example, clients 102 and 112 execute a browser application which supports communication with a remote server, e.g., server 108, via data network 106 and gateway server 104, while in other embodiments, the client is directly coupled to data network 106. In one embodiment, the messaging protocol utilized is the HyperText Transfer Protocol (HTTP) and the information page is a web page. In another embodiment, the messaging protocol is the File Transfer Protocol (FTP), and the information page is a document file. In either instance, the request for the information page includes a document identifier comprised of the industry standard product identifier, without requiring the user to enter any additional language that is otherwise supported by the messaging protocol, e.g., query scripts and the like. In one embodiment, clients 102 and/or 112 are computer systems, while in an alternate embodiment, they are an electronic appliance, e.g., a webTV™ Internet Terminal available from Sony Electronics, Inc. of Park Ridge, N.J., that enables one to utilize the resources of data network 106 without the need of a full-featured computer system.

Each server 108, 116 and 117 is typically a computer system which can be accessed by clients via data network 106 either directly, or through a firewall 114 or other gateway server. As used herein, each server incorporating the teachings of the present invention, e.g., server 108, includes one or more information pages (e.g., HyperText Markup Language (HTML) compatible documents, or web-pages), which can be accessed via any of a number of appropriate messaging protocols for display by an appropriate user agent (e.g., browser) operating on a requesting client, e.g., client 102. In accordance with the teachings of the present invention, to be described more fully below, a server incorporating the teachings of the present invention includes an agent which, upon receiving a request including an industry standard product identifier for an information page or directory that does not exist, constructs and issues commands or queries to search for and retrieve from accessible resources (e.g., databases) information corresponding to the product associated with the industry standard product identifier included in the received request, and generates executable instructions to create the requested information page for provision at the requesting client. In alternate embodiments, the ISPID is a multiple listing service (MLS) identifier for real estate, a vehicle identification number (VIN) identifier for automobiles, a stock-keeping unit (SKU) identifier for various manufactured products, or a universal identifier (UID) for other products. Thus, a merchant utilizing the teachings of the present invention may well use one of the above identified product codes, or variations thereof, to place information regarding their products on the internet, at uniquely addressable locations, without the need of generating individual information pages/directories for that information prior to receiving the request for information. That is, the present invention enables a merchant to leverage their pre-existing information resources to dynamically create information pages for each of their products at uniquely addressable locations on a data network using their product code as the address.

As alluded to above, data network 106 is a combination of multiple conventional hardware components, including computer systems, routers, repeaters, gateways, and switches interconnected, potentially throughout the world, with wireline and wireless (e.g., satellite, terrestrial, and the like) communication connections. These hardware components are organized to provide multiple logical levels of networks, which route data from one computer system to another. According to one implementation, data is transferred between computer systems using the well-known Transmission Control Protocol/Internet Protocol (TCP/IP) protocol. Data is generally transferred between network elements in units commonly referred to as "packets" or "datagrams".

The communication links illustrated in FIG. 1 may be any of a wide range of conventional wireline and wireless communication media, and may be different for different clients 102, hosts 108 and network devices 104. For example, a communication link may be a cable, a fiber optic cable, or may represent a nonphysical medium transmitting electromagnetic signals in the electromagnetic spectrum. Additionally, a wireless communication link may also include any number of conventional routing or repeating devices, such as satellites or electromagnetic signal repeaters or basestations.

Figure 2:
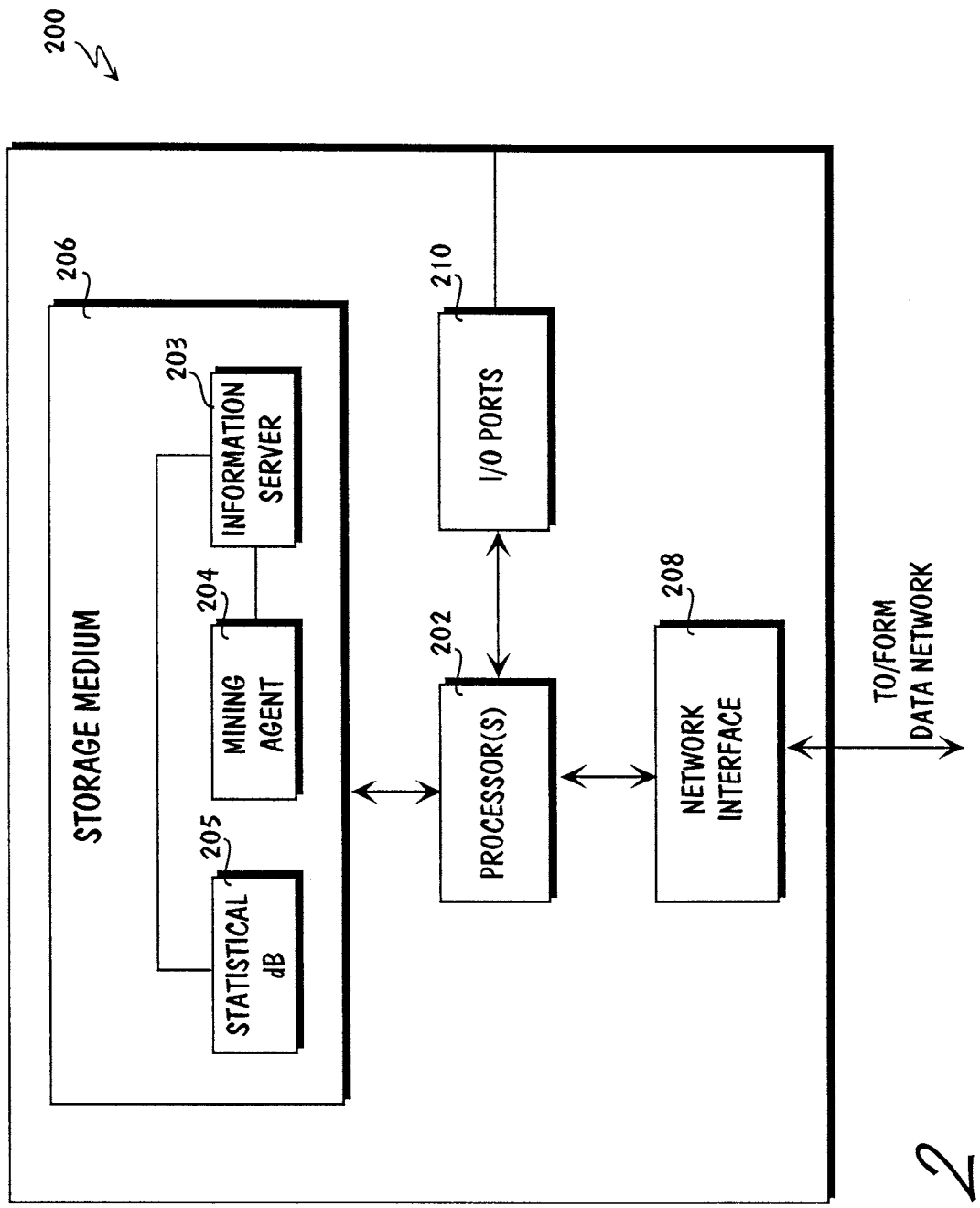
FIG. 2 illustrates a block diagram of an example server incorporating the teachings of the present invention, in accordance with one embodiment of the present invention.

Having introduced the operating environment within which the teachings of the present invention may be practiced with reference to FIG. 1, above, an example server incorporating the teachings of the present invention will now be developed with reference to FIG. 2.

With reference to FIG. 2, a block diagram of an example server incorporating the teachings of the present invention is depicted, in accordance with but one embodiment of the present invention. In accordance with the illustrated example embodiment of FIG. 2, server 200 is shown comprising one or more processor(s) 202 and a storage medium/device 206 including executable instructions to implement information server 203 and mining agent 204 incorporating the teachings of the present invention. In certain embodiments, storage medium 206 also includes instructions to implement a statistical database 205 which is used to compile and maintain a statistical history of marketing effectiveness, as shown. In addition to the foregoing, server 200 also includes network interface 208 and input/output (I/O) ports 210 each communicatively coupled to processor(s) 202 as shown. Thus, in accordance with one embodiment of the present invention, server 200 may well be incorporated into data network 100 as one or more of servers 108, 116 and/or 117 facilitating the perception that an end user has direct access to information pages containing product information utilizing industry standard product identifiers in the information request when, in fact, such information pages may not exist prior to the request.

As used herein, network interface 208 enables server 200 to communicate with remote devices over communicatively coupled data networks. In one embodiment, network interface 208 facilitates receipt of requests in any of a number of messaging protocol formats for information from remote clients. In one embodiment, the requesting client formulates a request in accordance with the HTTP messaging protocol by generating a uniform resource locator (URL) address including a resource identifier comprised of an industry standard product identifier (ISPID). Thus, network interface 208 is intended to represent any of a number of communication interfaces supporting any of a number of alternative communication/data networking protocols commonly known to those in the data networking arts. In particular, network interface 208 is intended to represent any of a number of wireline and wireless communication media through which these interfaces may communicate with remote clients, client subnetworks, and data network 106. Similarly, input/output ports 210 enable server 200 to communicate with directly coupled devices such as, for example, disk drives, modems, and the like. Network interfaces and I/O ports are well known in the art and need not be described further.

Storage medium/device 206 is intended to represent any of a number of alternative storage media commonly known in the art. In one embodiment, for example, storage medium/device 206 is a memory device, or an array of such devices, such as a random access memory (RAM), flash memory device, or the like. In one embodiment, storage medium/device 206 is a magnetic storage media such as a hard disk, redundant array of inexpensive disks (RAID) system, re-writeable compact disk, tape media, or the like. In one embodiment, to be described more fully below, storage medium 206 includes executable instructions which, when executed by processor(s) 202 implement information server 203, mining agent 204 and, optionally, statistical database 205. As will be described in greater detail below, information server 203 generates instructions to create an information page for provision to a requesting client in response to a request for an information page which may or may not exist. More specifically, upon receiving a request including a resource identifier for an information page/directory that does not exist, processor(s) 202 implementing information server 203 invoke an instance of mining agent 204 which determines if the received information request includes an resource identifier comprised of an industry standard product identifier (ISPID) and, if so, constructs and issues search commands in an effort to retrieve the requested information from accessible resources. As will be described more fully below, mining agent 204 may well access local and/or remote information resources via I/O ports 210 and network interface 208, respectively.

In accordance with one embodiment of the present invention, processor(s) 202 implementing information server 203 and mining agent 204 work cooperatively to implement the many aspects of the present invention. As used herein, processor(s) 202 are intended to represent any of a number of microprocessors, microcontrollers, programmable logic devices (PLDs), application specific integrated circuits (ASICs) and the like known in the art. In accordance with the teachings of the present invention, processor(s) 202 implementing information server 203 respond to requests for information received from remote client(s) via data network 106 and network interface 208. In particular, in accordance with one aspect of the present invention to be described more fully below, upon receiving a request for information which includes an industry standard product identifier, processor(s) 202 implementing information server 203 determine that the requested information page does not exist, and invokes an instance of mining agent 204 which recognizes the industry standard product identifier (ISPID) in the received request. Accordingly, instead of immediately replying to the requesting client that the requested information page is not available, mining agent 204 constructs and issues search commands to accessible resources to access and retrieve information associated with the product identified by the industry standard product identifier contained within the resource identifier of the received request. Mining agent 204 provides information server 203 with any information identified associated with the industry standard product identifier. In response to the request for the information page that does not exist, processor(s) 202 implementing information server 203 dynamically generate the instructions necessary to create the requested information page for provision to the requesting client including at least a subset of the information provided on the product requested by mining agent 204. In one embodiment, the instructions generated and issued by processor(s) 202 and information server 203 is HTML code. In an alternate embodiment, the instructions generated and issued by processor(s) 202 and information server 203 is JAVA code, or ActiveX code.

In accordance with the teachings of the present invention, mining agent 204, searches accessible databases for information associated with the industry standard product identifier received in a request for information from a remote client. In one embodiment, for example, mining agent 204 generates instructions with which to query the accessible databases and includes the industry standard product identifier received from the remote client via network interface 208 and processor(s) 202. In one embodiment, the search commands are SQL commands. In one embodiment, the information resource is a local database, wherein mining agent 204 issues the search command via processor(s) 202 and I/O port 210. In an alternate embodiment, mining agent 204 employs common gateway interface commands in addition to SQL search commands to access remote databases, e.g., database 118, through a gateway server, e.g., server 117. In one embodiment, mining agent 204 employs a hierarchical search of all accessible resources by first accessing local databases before accessing remote databases.

As alluded to above, in one embodiment, the search commands issued by mining agent 204 are SQL queries to a database. More specifically, mining agent 204 generates SQL commands including in one or more terms all or part of the industry standard product identifier parsed by and received from processor(s) 202. In one embodiment, for example, mining agent 204 constructs and issues the following SQL command to retrieve information on property style, price, the number of bedrooms and baths for a particular property identified by the ISPID in the received request:

SELECT style, price, beds, baths FROM properties WHERE mlsid=BC57402. In an alternate embodiment, mining agent 204 constructs and issues the following SQL command to communicatively coupled information resources to retrieve information on vehicle model, style, color and price for the automobile identified by the ISPID in the received request:

SELECT model, style, color, price FROM vehicle_stock WHERE vin=1J342M54789. In one embodiment, the search conducted by mining agent 204 is typically completed during the window of latency commonly associated with the download of a web page from a remote server and, thus, with little to no perceptible delay to the end user. Thus, in accordance with the teachings of the present invention, a car dealership employing a server incorporating the teachings of the present invention effectively places their entire inventory on an accessible data network, wherein a customer simply enters a network address with the vehicle identification number (VIN) of the car of interest, and the server dynamically generates instructions to create the requested information page for provision to the requesting client. Accordingly, those skilled in the art will appreciate that the innovative server incorporating the teachings of the present invention may well be practiced in a number of alternate forms and embodiments without deviating from the spirit and scope of the present invention to enable vendors to make their products all the more accessible to clients, thereby increasing the number of leads and final sales.

Although depicted as executable code within storage medium 206, those skilled in the art will appreciate that information server 203 and mining agent 204 may well take many alternate forms. In one alternate embodiment, for example, mining agent 204 is a separate functional block, embodied within an application specific integrated circuit (ASIC), a microcontroller, a special purpose processor, a software application and the like. Similarly, information server 203 may well be embodied as a special purpose processor, controller ASIC or PLD. Further, in alternate embodiments, the functionality of mining agent and information server 203 may well be embodied within a single functional element without departing from the spirit and scope of the present invention. Accordingly, the foregoing example embodiments provided herein are to be regarded as illustrative and not exhaustive.

Given the foregoing architectural and functional descriptions of the first aspect of the present invention, those skilled in the art will recognize and appreciate the application of the present invention to network servers supporting e-commerce. Take, for example, a web site, i.e., a real estate information server. As alluded to above, prior art web sites supporting real estate databases typically required either a lengthy, uncomprehensible URL incorporating query strings, or multiple queries to identify and obtain information on a particular property, e.g., a first query to get to a realtor web site and a second query of their property database using, e.g., a multiple listing service (MLS) identifier for the property as a query term. A server incorporating the teachings of the present invention, however, will accept a data network request including the ISPID (e.g., the MLS identifier) in any of a number of alternate messaging protocols associated with the property for an information page, and selectively invoke mining agent 204 if the requested information page does not exist to search accessible information resources for information associated with the ISPID and reply by dynamically generating the instructions to create the requested information page for provision to the requesting client. That is, the teachings of the present invention facilitate the perception by the end user at the requesting client that each product identified by an industry standard product identifier has its own information site or information page when, in fact, such site or page does not necessarily exist prior to the server receiving the request.

Having introduced the architectural elements of the present invention with reference to FIG. 2, the operation of the first aspect of the present invention will now be described with reference to FIG. 3. However, for ease of explanation, and not limitation, the operation of a web server incorporating the teachings of the present invention will be developed in FIG. 3 with continued reference to FIGS. 1 and 2.

Accordingly, with reference to FIG. 3, a method for managing the identification and dissemination of information content from an information server incorporated with the teachings of the present invention will be described within the context of an example information exchange. In particular, for purposes of explanation and not limitation, the teachings of the present invention will be described within the context of an example implementation wherein client 102 requests information from server 108 incorporating the teachings of the present invention in accordance with any of a number of messaging protocols. In accordance with one embodiment, for example, a user at a client computer issues a request for product information from server 108 incorporating the teachings of the present invention using the HTTP messaging protocol. In one embodiment, the request is in the form of a uniform resource locator (URL) comprising only a domain name and resource identifier comprised of an industry standard product identifier (ISPID). The request is passed to data network 106 via gateway server 104 to server 108, which receives the request in block 302. In particular network interface 208 of server 108 receives the request for information from communicatively coupled data network 106, and passes the received request to processor(s) 202 which invoke an instance of information server 203.

At block 303, information server 203 determines whether the requested information page/directory identifier by the received request exists. If the requested information page/directory does exist, information server 203 provisions the instructions to create the requested information page/directory to the requesting client via processor(s) 202, network interface 208 and data network 106, block 306.

If, however, information server 203 determines in block 303 that the requested information page/directory does not exist, processor(s) 202 implementing information server 203 determine whether the received request includes a resource identifier comprised of an industry standard product identifier (ISPID), block 304. In one embodiment, for example, processor(s) 202 implementing information server 203 examine the request for information received in accordance with the HTTP protocol and determine whether the request includes an industry standard product identifier. One example of a request for information containing an industry standard product identifier is presented below in accordance with the HTTP messaging protocol. In this example, an MLS identifier (real estate) is used to denote an web page and is provided as a server/resource identifier as follows:

www.homelist.com/BC57402

In accordance with the above HTTP example, www.homelist.com represents the domain name which uniquely identifies the target server (e.g., server 108), while BC57402 is a resource identifier comprised of an ISPID denoting the requested information page, which in this example does not exist prior to receiving the request. In accordance with the teachings of the present invention, however, processor(s) 202 implementing information server 203, upon determining that the requested information page does not exist, determines that the requested information page denotes an industry standard product identifier (MLS code) which uniquely identifies a particular property of interest. In an alternate embodiment, the industry standard product identifier may well be used to denote a domain name (e.g., a particular server). One example in accordance with the HTTP messaging protocol is presented below, wherein an MLS identifier is used to denote a web site wherein the following domain name may be provided via the HTTP messaging protocol:

BC57402.homelist.com

In accordance with the above example, the ISPID is used to denote the domain, rather than a particular information page/directory.

If, in block 304, information server 203 determines that the received request does not include a resource identifier comprised of an industry standard product identifier, information server 203 generates and issues an appropriate response to the requesting client, block 312. In one embodiment, information server 203 generates instructions to create a default information page for provision to the requesting client. In an alternate embodiment, information server 203 issues an error response for provision to the requesting client.

If, however, processor(s) 202 implementing information server 203 recognize that the received request includes a resource identifier comprised of an industry standard product identifier (ISPID), information server 203 passes the received ISPID to mining agent 204, which constructs and issues one or more query commands to accessible information resources, block 308. In one embodiment, mining agent 204 includes at least a subset of the information contained within the received resource identifier, e.g., the ISPID, in the search command. In an alternate embodiment, mining agent 204 correlates the ISPID received in the request to some other product identifier, which is used in the search command. In one embodiment, mining agent 204 issues the command to a local database, e.g., database 110 via I/O ports 210. In alternate embodiments, mining agent 204 issues the search command to local and remote databases simultaneously via I/O ports 210 and network interface 208, respectively. That is, if the requested information is not available from local sources, e.g., database 110, mining agent 204 issues search commands to remote databases, e.g., database 118 via processor(s) 202, network interface 208, data network 106 and server 117. One example embodiment of an information resource database is provided with reference to FIG. 6.

Turning briefly to FIG. 6, an example embodiment of a product database suitable for use in accordance with the teachings of the present invention is presented. In one embodiment, database 600 is suitable for use as local database 110 or remote database 118 in data network 100. In accordance with the illustrated example embodiment, database 600 is shown comprising a number of data fields each containing information regarding a particular attribute of the product listed. In the illustrated example embodiment, product database 600 contains information regarding real estate. As shown, each of the properties listed are referenced by their unique industry standard product identifier, or MLS identifier, in field 602. In fields 604 through 618, various attributes of the product are listed for each of the properties identified in field 602. In one embodiment, the listing agent 604, architectural style 606, price 608, number of bedrooms and baths 610 and 612, indication of air condition or garage 614 and 616 and the annual taxes are presented in product database 600. Those skilled in the art will appreciate that any of the product criteria listed in database 600 is searchable. Thus, while mining agent 204 generates search commands including the ISPID (i.e., the MLS identifier of database 600), those skilled in the art will appreciate that other search terms may well be used without deviating from the spirit and scope of the present invention.

In block 310, processor(s) 202 implementing an instance of mining agent 204 determines whether the search of accessible databases was successful, i.e., whether the requested information identified by the industry standard product identifier was available from local and/or remote information sources accessible from server 108. In one embodiment, if the information is not accessible, mining agent 204 so informs processor(s) 202 and information server 203, which issue an appropriate response to the requesting client 102, block 312. As provided above, in one embodiment information server 203 issues a response informing the user that the information is not available, block 312. In an alternate embodiment, processor(s) 202 issue an invalid address response to the requesting client in accordance with the messaging protocol utilized. In alternate embodiments, processor(s) 202 and information server 203 may well generate and issue to the requesting client instructions to provision a default information page when the requested information is not available.

If the search of accessible resources conducted by mining agent 204 in block 310 is successful, mining agent 204 passes the retrieved information to processor(s) 202 implementing information server 203, which generates instructions to create the requested information page for provision to the requesting client 102, block 314. That is not to say, however, that processor(s) 202 implementing information server 203 wait until the search is complete to begin to provision the information page at the remote client 102. In one embodiment, for example, processor(s) 202 begin issuing commands to requesting client 102 immediately, enabling a browser operating on client 102 to begin to render an information page within which the information on the product will be displayed once mining agent 204 receives a response from queried databases.

Those skilled in the art will appreciate, from the foregoing, that a server incorporated with the teachings of the present invention dynamically generates a custom information page in response to receiving a request including a resource identifier comprised of an ISPID for an information page/directory that may or may not exist, giving the end user the perception that each product identified by an ISPID has a dedicated information page when, in fact, it may not. The innovation herein described facilitates this perception of the end user, while enabling the commerce enterprise to utilize their preexisting product databases. Thus, the present invention represents an improvement in information management and content delivery by making product information more readily available without requiring wholesale changes in how such information is stored and maintained at the server.

Figure 5:
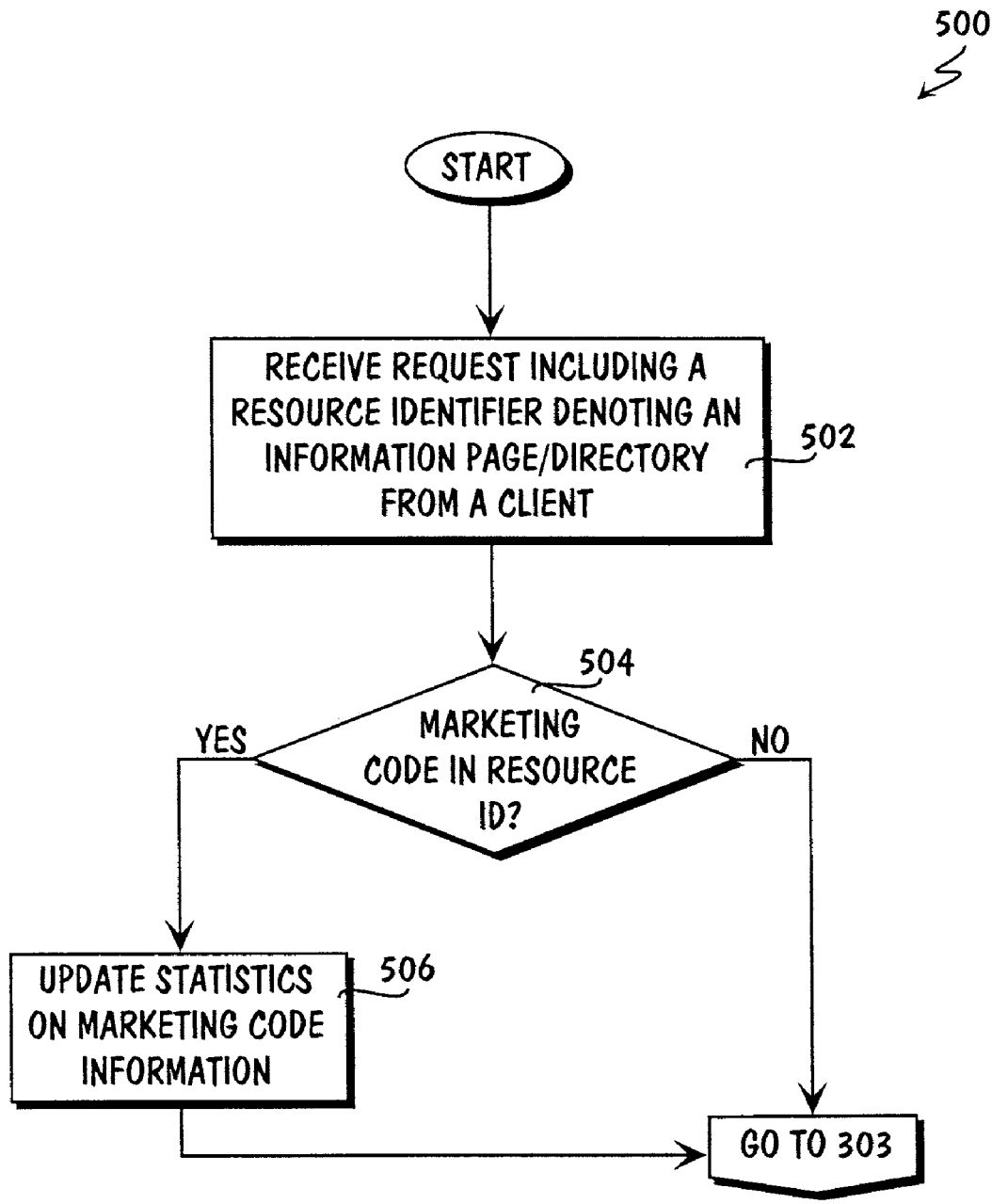
FIG. 5 illustrates a flow chart of an example method for tracking the source of referrals to information sources in accordance with one aspect of the present invention.

Having described this first aspect of the present invention with reference to FIGS. 1-3, another aspect of the present invention will be described with reference to FIG. 5. That is, FIG. 5 illustrates an example method for compiling and maintaining a statistical history of the marketing efforts resulting in requests of the information server 203. In one embodiment, for example, a commercial enterprise utilizes different marketing codes in their marketing literature when referencing a resource identifier for an information page/directory associated with a particular product. When an end user accesses the information using the denoted network address including the marketing code, processor(s) 202 implementing information server 203 invoke an instance of statistical database 205 incorporating the teachings of the present invention to correlate the marketing code with the source marketing material and tracks the effectiveness of particular marketing materials.

Accordingly, with reference to FIG. 5, the method begins as before when server 108 incorporating the teachings of the present invention receives a request for information from remote client 102, block 502. As described above, the request is received from data network 106 via network interface 208 and processor(s) 202. In block 504, processor(s) 202 implementing information server 203 determine whether the received request includes a marketing code. In one embodiment, information server 203 recognizes any of a number of alternative separate marketing codes, as provided in Table 1, below. In one embodiment, information server 203 may well assume that any additional identifiers are marketing codes. In alternate embodiments, information server 203 looks up the marketing code to correlate it with the marketing material in order to further refine and customize the information provisioned to the requesting client. In one embodiment, for example, information server 203 issues instructions to provision within the requested information page/directory a "thank you" for using the source marketing materials, e.g., a buyers guide.

TABLE 1

Marketing Codes and Associated Sources

| Marketing Code | Corresponding Marketing Source |
|---|---|
| P | Print Media |
| AG # | A Particular Sales Agent |
| R | Radio Advertising |
| T | Television Advertising |
| I | Internet Advertising |
| BG | Buyers Guide (particular publication) |

In accordance with the illustrated example embodiment, information server 203 recognizes five (5) different marketing codes, one each associated with print advertising, sales person advertising/referrals, radio advertising, television advertising and Internet advertising. Thus, an example request for information in accordance with the HTTP protocol might look like the following server/resource identifier: www.homelist.com/BC54705BG, which represents that the user requesting information on the product identified by ISPID BC57403 learned of the information page through an advertisement in a particular publication, in this case a buyers guide. In the foregoing example embodiment, simple codes are used to illustrate the teachings of the present invention. Nonetheless, those skilled in the art will appreciate that marketing codes of greater or lesser complexity may well be used depending on the amount and detail of information the hosting enterprise requires. Accordingly, the use of marketing codes of greater or lesser complexity in accordance with the teachings of the present invention is anticipated by the teachings herein.

Figure 3:
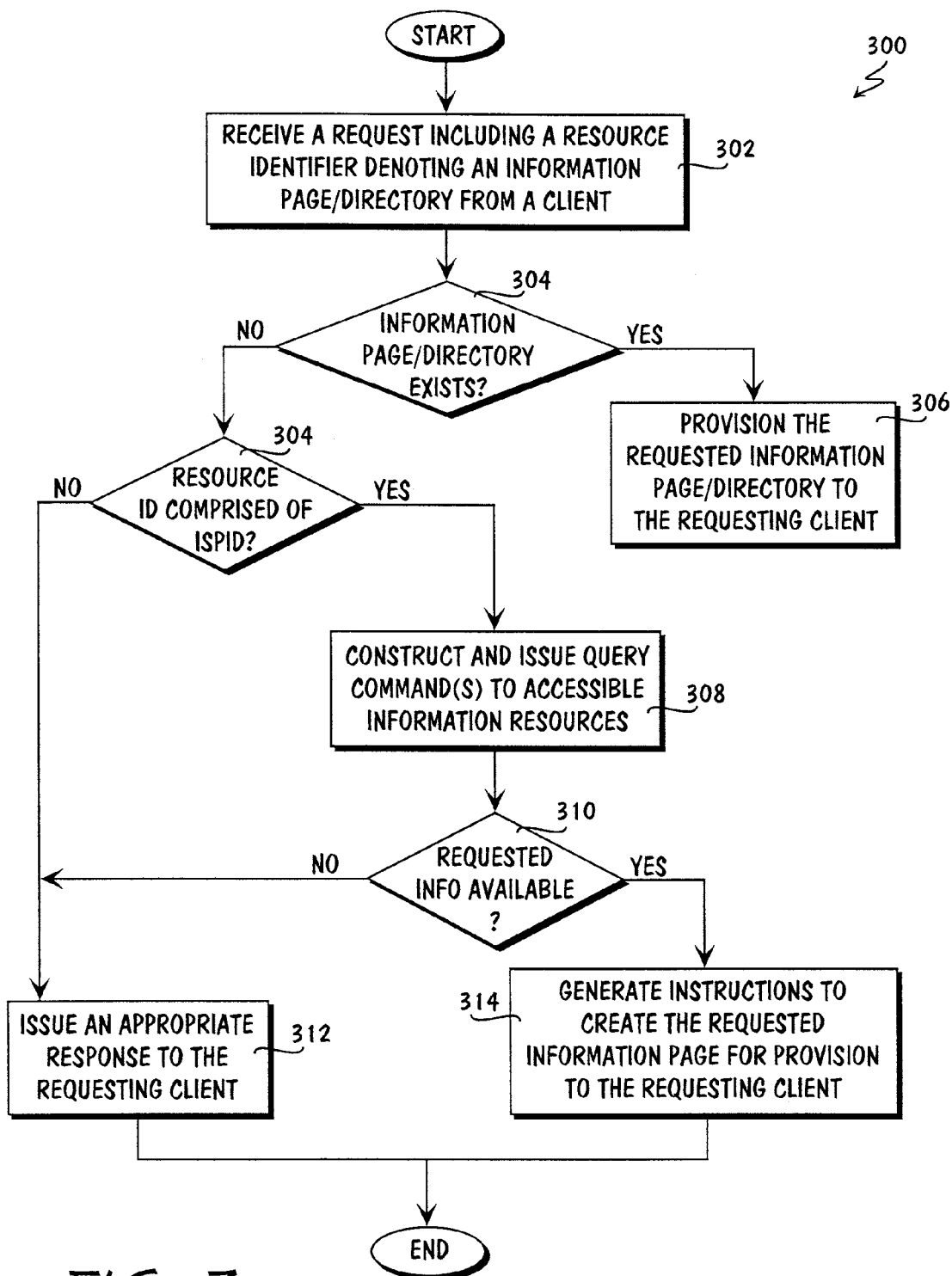
FIG. 3 illustrates a flow chart of an example method for managing the availability of information content incorporating the teachings of the present invention.

If, in block 504, it is determined that the received request for information does not contain any marketing codes, the process continues with block 303 of the method illustrated in FIG. 3. Alternatively, if in block 504 processor(s) 202 implementing information server 203 identify marketing codes in the received request, and invoke an instance of statistical database 205 which updates any of a number of statistics maintained regarding such marketing codes in block 506. In one embodiment, for example, processor(s) 202 implementing statistical database 205 update the database with information regarding the type of marketing code, when it was received, where it was received from, and the like. In one embodiment, once the marketing database has been updated, the process continues with block 303 of the method described above in FIG. 3.

In accordance with one aspect of the present invention, a marketing evaluation report is automatically generated periodically by a server incorporating the teachings of the present invention. In one embodiment, the report generation function is a function of information server 203 selectively invoked by processor(s) 202. The frequency of such reporting is controlled by the hosting enterprise operating the server incorporating the teachings of the present invention, e.g., server 200. In one embodiment, server 200 automatically generates a marketing evaluation report on a periodic basis, e.g., a daily, weekly, monthly, quarterly or yearly basis. In an alternate embodiment, such evaluation reports may be automatically generated on demand. One example embodiment of an automatically generated marketing report is provided with reference to FIG. 7.

As shown in FIG. 7, server 200 automatically generates a marketing evaluation report 700 for the period identified in field 701 summarizing marketing information associated with several different marketing codes. In one embodiment, for example, marketing report 700 identifies several different statistics compiled and maintained by processor(s) 202 in accordance with information server 203 and statistical database 205. In one embodiment, for example statistics on the effectiveness of product agents 702, television advertising 704, radio advertising 706, Internet advertising 708 and print media 709, are maintained with different summary information 710 for each. In one embodiment, the summary information 710 provided for each of the illustrated marketing codes includes the number of hits generated (e.g., the number of times a request for information is received by information server 203), the number of requests for further information, requests for telephone call follow up and the price range of the products accessed using the particular marketing code. Accordingly, while agent 0 generated a large number of hits, those hits resulted in only 25 requests for telephone call follow up, while agent 112 only generated 250 hits to the web site, it resulted in 50 requests for follow up telephone calls. Just as the effectiveness of particular agent marketing can be compared and contrasted, so, too, can the effectiveness of different media, as television 704 can be compared to radio 706 and the Internet 708. Those skilled in the art will appreciate that marketing report 700 is but one example, and that marketing reports with greater or lesser complexity may well be generated by server 200 without deviating from the spirit and scope of the present invention. For example, statistical analysis may well be employed to identify under performing marketing campaigns, cyclical changes in marketing effectiveness corresponding to season, etc.

Figure 4:
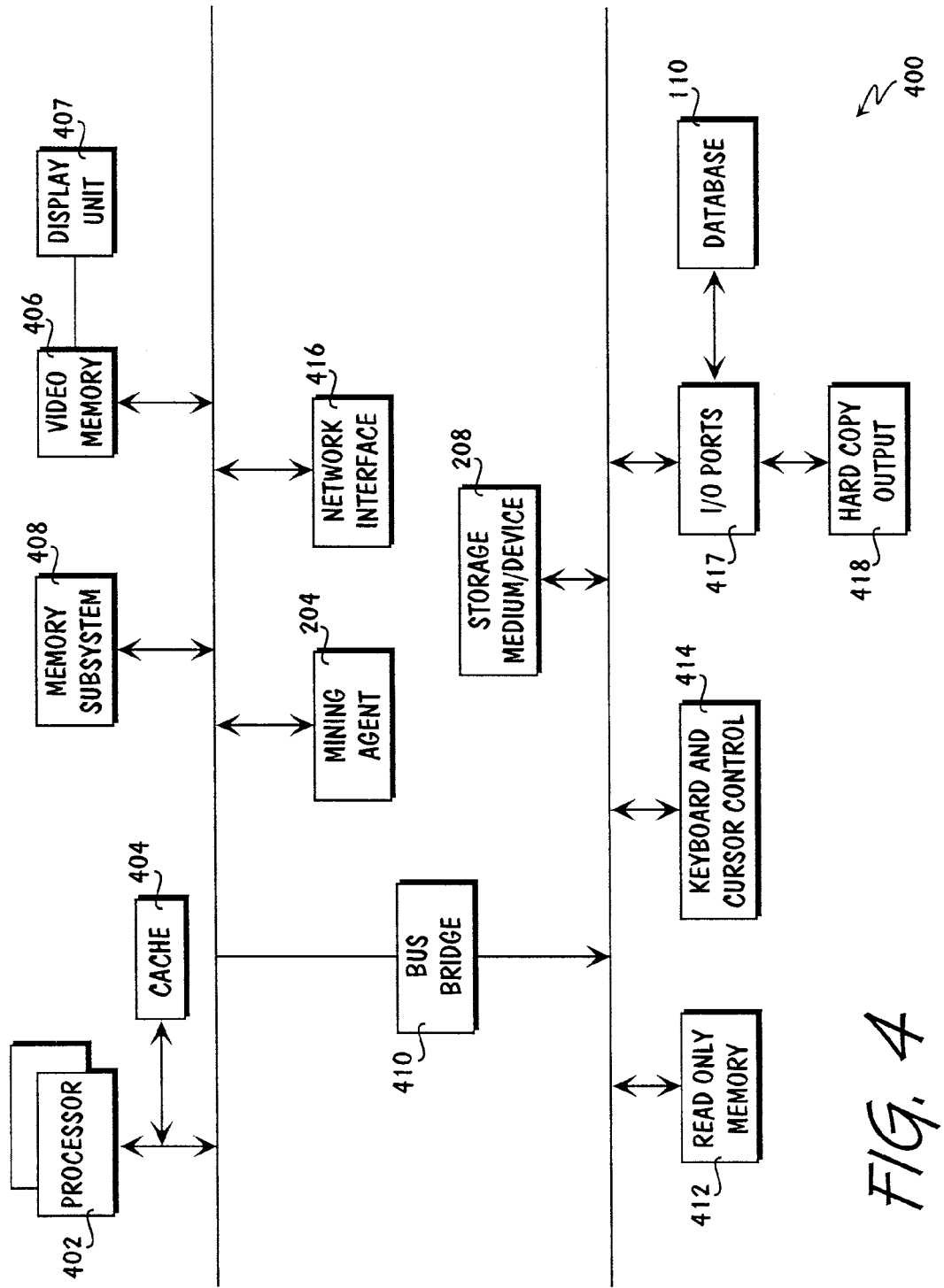
FIG. 4 illustrates a block diagram of an example server incorporating the teachings of the present invention, in accordance with an alternate embodiment of the present invention.

In addition to the example embodiments presented above, an alternate embodiment of a server incorporating the teachings of the present invention is presented with reference to the block diagram of FIG. 4. More specifically, FIG. 4 illustrates a block diagram of server 400 including the innovative mining agent 204 associated with one aspect of the present invention introduced above. As shown, server 400 comprises processor(s) 402 with associated cache(s) 404, bus bridge 410, network interfaces 416, memory subsystem 408, video memory 406 and display device 407, and mining agent 204 incorporated with the teachings of the present invention, coupled as shown. As with the embodiments presented above, mining agent 204 is intended to represent any of a number of alternative embodiments, including embodiments wherein mining agent 204 is not a separate functional entity, but rather executable instructions stored on storage medium/device 208 and selectively executed by one or more of processor(s) 402. In accordance with the teachings of the present invention, processor(s) 402 implementing the innovative information server, mining agent 204 and accessible information resources cooperatively function to provide a requesting client with information associated with an industry standard product identifier (ISPID) received in a resource identifier of a request for an information page/directory and/or an information server.

In addition to those elements enumerated above, server 400 also includes storage medium/device 208, read only memory 412, keyboard and cursor control device 414 and input/output (I/O) ports 417 communicatively coupling peripheral devices such as, for example, a hard copy output device 418 and/or database 110. In one embodiment, server 400 is a computer system having a large amount of storage space (typically on the order of hundreds of gigabytes or terabytes), with multiple network interfaces 416 which support multiple simultaneous virtual connections between clients 102 and communicatively coupled data networks, e.g., data network 106. Accordingly, network interface 416 is intended to represent a number of alternative communication interfaces which enable server 400 to communicate with remote clients via any of a number of alternative communication technologies. Except for the teachings of the present invention, described above, elements 402-418, 208 and 110 are representative of those commonly known in the art. Thus, those skilled in the art will appreciate that servers of greater or lesser complexity may well be substituted for server 400 without deviating from the spirit and scope of the present invention.

Figure 8:
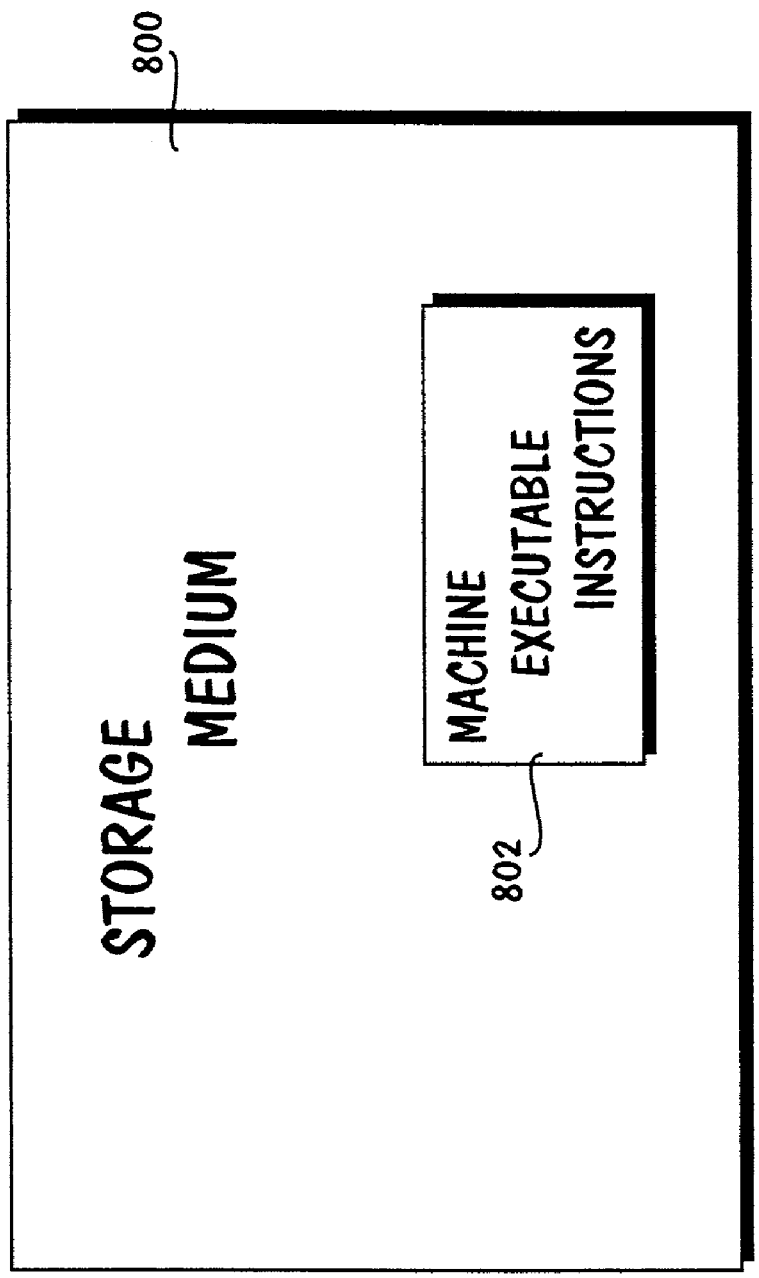
FIG. 8 illustrates a block diagram of a storage medium having stored therein executable instructions for implementing the teachings of the present invention, in accordance with an alternate embodiment of the present invention.

In another embodiment of the present invention, the teachings of the present invention for content management and delivery are embodied in software. Accordingly, FIG. 8 illustrates an example storage medium 800 having stored thereon machine executable instructions 802 which, when processed by a controller transforms an appropriately configured machine executing machine executable instructions 802 into a server incorporating the teachings of the present invention. In accordance with the illustrated example embodiment of FIG. 8, storage medium 800 is intended to represent any of a number of alternative storage media including, but not limited to, floppy disks, magnetic tape, compact disk, digital versatile disk, optical disks, and the like. Further, those skilled in the art will appreciate that the machine executable instructions need not be located within the machine executing the instructions, but may be accessed from communicatively coupled devices.

In light of the foregoing, those skilled in the art will appreciate that the present invention not only provides for improved information management and delivery, but also includes innovative tracking and reporting features from which a host commercial enterprise can identify and quantify the source of referrals to the products supported by this innovative server. In addition to the embodiments described above, those skilled in the art will appreciate that the teachings of the present invention may well be integrated within a single integrated circuit (not shown). That is, those skilled in the art will appreciate that advances in IC fabrication technology now enable complex systems to be integrated onto a single IC. Thus, in accordance with one embodiment of the present invention, the teachings of the present invention may be practiced within an application specific integrated circuit (ASIC), programmable logic device (PLD), microcontroller, processor and the like.

While the many innovative features and aspects to the present invention have been described in terms of the above illustrated embodiments, those skilled in the art will recognize that the invention is not limited to the embodiments described. The present invention can be practiced with modification and alteration within the spirit and scope of the appended claims. In particular, the present invention may be practiced with other features and/or feature settings. Particular examples of other features include but are not limited to transaction communication protocols and architectural attributes. Accordingly, the description is to be regarded as illustrative instead of restrictive on the present invention.

Thus, alternate embodiments of the many innovative aspects of a method, apparatus and system for improved content management and delivery has been described.

What is claimed is:

1. An apparatus for the provisioning of information pages comprising:
   a storage device having stored therein a plurality of executable instructions that implements an information server, when contacted by a client device using a uniform resource locator (URL) comprising a server name of the information server immediately followed by a separator immediately followed by a pseudo resource identifier nominally identifying a resource of the information server in accordance with a URL standard, the information server interprets a first portion of the pseudo resource identifier as a product identifier identifying a product and a second portion of the pseudo resource identifier as a marketing code identifying a type of media used to disseminate the URL, the type of media being a radio medium, a television medium, or a print medium, and in response, constructs and issues one or more queries including the product identifier to retrieve information corresponding to the identified product; dynamically generates instructions to create an associated information page for the identified product for provisioning to the client device, with at least a portion of information presented in the associated information page including an explicit reference to the type of media used to disseminate the URL, and maintains statistics for the marketing code; and at least one processor coupled to the storage device to execute the stored executable instructions.

2. The apparatus of claim 1, wherein the product identifier is comprised of an industry standard product identifier (ISPID).

3. The apparatus of claim 2, wherein the industry standard product identifier is a multiple listing service (MLS) identifier.

4. The apparatus of claim 2, wherein the industry standard product identifier is a vehicle identification number (VIN) identifier.

5. The apparatus of claim 2, wherein the information server responds to requests for an information page comprised of the ISPID, whether the requested information page exists prior to the request or not.

6. The apparatus of claim 1, wherein the information server further includes a report function which periodically, automatically compiles and generates a marketing report based, at least in part, on the statistics.

7. The apparatus of claim 1, wherein the information server further includes a report function which on demand, automatically compiles and generates a marketing report based, at least in part, on the statistics.

8. The apparatus of claim 1 wherein the storage device has additional executable instructions that provision the created information page to the client.

9. The apparatus of claim 1, wherein said constructing and issuing of the one or more queries further includes issuing a first query of the one or more queries to a local information resource, and, in the event that the local information resource does not include the requested information, issuing a second query of the one or more queries to a remote information resource.

10. The apparatus of claim 1, wherein the type of media is the television medium or the radio medium.

11. The apparatus of claim 1, wherein the type of media is the print medium, and wherein the print medium is a buyer's guide.

12. An article of manufacture comprising:
a recordable medium having recorded thereon a plurality of machine executable instructions implementing an information server having a plurality of functions for provisioning resource information pages, the functions including a function such that when contacted by a client device using a uniform resource locator (URL) comprising a server name of the information server immediately followed by a separator immediately followed by a pseudo resource identifier nominally identifying a resource of the information server in accordance with a URL standard, the information server is to interpret a first portion of the pseudo resource identifier as a product identifier identifying a product and a second portion of the pseudo resource identifier as a marketing code identifying a type of media used to disseminate the URL, the type of media including a radio medium, a television medium, or a print medium, and, in response, to construct and issue one or more queries to retrieve information associated with the identified product; to dynamically generate instructions to create the associated information page for the identified product for provisioning to a client, with at least a portion of information presented in the associated information page including an explicit reference to the type of media used to disseminate the URL; and to maintain statistics for the marketing code.

13. The article of manufacture of claim 12 further comprising a function to provision the created information page to the requesting client.

14. The article of manufacture of claim 13, wherein the product identifier is comprised of an industry standard product identifier (ISPID).

15. The article of manufacture of claim 14 wherein the information server responds to requests comprised of the ISPID for an information page whether the requested information page exists prior to the request or not.

16. The article of manufacture of claim 13, wherein the information server includes a report generation function which periodically and/or on demand automatically generates a report including the maintained statistics.

17. A method comprising:
receiving a uniform resource locator (URL) including a server name of an information server followed by a separator followed by a pseudo resource identifier nominally identifying a resource of the information server in accordance with a URL standard;
interpreting a first portion of the pseudo resource identifier as a product identifier identifying a product and a second portion of the pseudo resource identifier as a marketing code identifying a type of media used to disseminate the URL, the type of media including a radio medium, a television medium, or a print medium;
providing an information page associated with the product to a requesting client device, at least a portion of the information page including an explicit reference to the type of media used to disseminate the URL; and maintaining statistics for the marketing code.

18. The method of claim 17, wherein said providing an information page comprises:
constructing and issuing one or more queries to receive information associated with the product; and
dynamically creating the information page.

19. The method of claim 17, wherein the product identifier includes an industry standard product identifier (ISPID).

20. The method of claim 17, wherein the type of media includes the television medium or the radio medium.

21. The method of claim 17, further comprising:
maintaining statistics for a plurality of marketing codes, including the marketing code, respectively corresponding to a plurality of types of media, including the type of media.

* * * * *

UNITED STATES PATENT AND TRADEMARK OFFICE
CERTIFICATE OF CORRECTION

| | | |
|---|---|---|
| PATENT NO. | : 7,712,019 B1 | Page 1 of 1 |
| APPLICATION NO. | : 09/664578 | |
| DATED | : May 4, 2010 | |
| INVENTOR(S) | : Stephen C. Roderick | |

It is certified that error appears in the above-identified patent and that said Letters Patent is hereby corrected as shown below:

Title Page of Patent; item (63);

The priority data was omitted from the face of the patent by the U.S. Patent Office. The following should be added:

"Related U.S. Application Data
Continuation of application No. 09/228,259, filed on Jan. 11, 1999, now Pat. No. 6,122,648."

Title Page of Patent; item (56);

The date of the non-patent literature submitted by Applicant, listed on the cover page at page 3, column 2, should be corrected.

"'The Real Estate Book ...,' Printed Mar. 22, 19999" should be replaced by --
"'The Real Estate Book ...,' Printed Mar. 22, 1999."

Signed and Sealed this
Twenty-eighth Day of June, 2011

David J. Kappos
*Director of the United States Patent and Trademark Office*